United States Patent Office 3,758,288
Patented Sept. 11, 1973

3,758,288
SELECTED THIADIAZOLO[3,4-d]PYRIDAZINE COMPOUNDS FOR PROTECTING PLANTS AGAINST AIR POLLUTION
Edward Levant Jenner, Wilmington, Del., assignor to E. I. du Pont de Nemours and Company, Wilmington, Del.
No Drawing. Filed Apr. 13, 1971, Ser. No. 133,723
Int. Cl. A01n 9/12
U.S. Cl. 71—90
3 Claims

ABSTRACT OF THE DISCLOSURE

Thiadiazolo[3,4-d]pyridazines of the formula

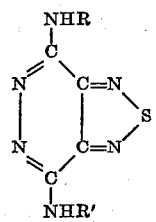

are useful in protecting plants against the damaging effects of various pollutants found in the air, as ozone.

BACKGROUND OF THE INVENTION

Field of the invention

This invention is concerned with a new class of heterocyclic organic compounds and their use to protect plants from damage by pollutants found in the air, as for example, ozone.

Description of the prior art

Air pollutants have been found to cause extensive injury to crop plants. There are numerous documented occurrences of air pollutant damage resulting in decreased crop yields and in fruits, vegetables and flowers being so badly damaged that they are unmarketable. Protection of plants against injury of this type would be of great value to agriculture.

The most common air pollutants which are known to damage plants are the photochemical oxidants. These are formed by the action of sunlight on air containing nitric oxide, nitrogen dioxide and hydrocarbons. The sources of these pollutants are well known. For example, nitric oxide and nitrogen dioxide are formed when mixtures of oxygen and nitrogen (as in air) are brought to high temperatures as in the operation of internal combustion engines, furnaces and power plants. Hydrocarbons come into the air from many sources, particularly from the incomplete combustion of fossil fuels such as coal and gasoline as well as by the evaporation of petroleum products during their processing, storage, transfer, sale and use.

Among the photochemical oxidants, the most active that have been identified are ozone and peroxyacetyl nitrate. Of these, ozone has been shown to be damaging to a wide variety of plants. It can cause extensive damage to plants at concentrations that appear to do no detectable harm to animals or humans.

When polluted air is filtered through an adequate bed of activated carbon, ozone and other pollutants are removed. Plants grown in such filtered air show no ozone damage in contrast to the extensive damage shown by plants grown in ozone-polluted air. It has further been found that when some materials are applied to ozone-sensitive plants, they impart to the plant some resistance to damage by ozone. Materials known to produce such effects include ascorbic acid, zinc and manganese ethylenebisdithiocarbamates, ferric dimethyldithiocarbamate, tetramethylthiuramidsulfide (E. W. Palm, Crops and Soils Magazine, January 1971, pp. 14–17), succinic acid 2,2-dimethylhydrazide (Chem. & Eng. News, Aug. 7, 1967, pp. 22–24) and N,N'-diphenyl-p-phenylenediamine (C. R. Thompson and G. Kats, California Agriculture, September 1970, pp. 12–13).

DESCRIPTION OF THE INVENTION

It has now been found that a new class of compounds protects plants against the deleterious effects of pollutants occuring in the air, particularly the photochemical oxidants such as ozone and peroxyacetyl nitrate. The invention is therefore a composition of matter comprising an effective amount of a compound having the formula

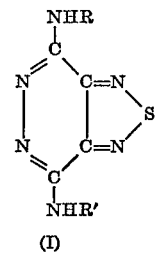

(I)

wherein

R and R', alike or different, are H, or carbacyl, that is

where R" is H or alkyl, or cycloalkyl of 1 to 6 carbon atoms, with or without a suitable carrier therefor, and the use of such compositions to protect plants against air pollutants.

The compounds of Formula I may be designated as 4,7-diamino[1,2,5]thiadiazolo[3,4-d]pyridazines and that compound of Formula I in which R and R' are hydrogen, is formed by the reaction of hydrazine with 3,4-dicyano-1,2,5-thiadiazole at temperatures in the range from 50–200° C.

Reaction of this product with formic acid or a carboxylic acid anhydride yields the compounds of Formula I in which R and R' are carbacyl, the particular carbacyl groups corresponding to the acid or acid anhydride employed. The reaction of hydrazine with 3,4-dicyano-1,2,5-thiadiazole may be illustrated as follows:

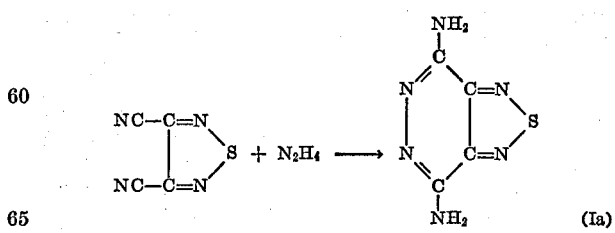

(Ia)

The reaction of hydrazine with 3,4-dicyano-1,2,5-thiadiazole may be carried out neat, particularly when an excess of liquid hydrazine is employed as a reaction medium. To provide for dissipation of the heat of reaction, the reaction is preferably carried out in the presence of a diluent which is inert to the reactants and products. Suitable diluents include primary alcohols, such as methanol, ethanol, and butanol; ethers, such as diethyl ether and tetrahydrofuran, and alcohol-water mixtures. No catalyst is required in the reaction.

Pressure is not a critical variable in the reaction and pressures both above and below atmospheric pressure may be employed. Atmospheric pressure is satisfactory.

The time required for the reaction to take place varies chiefly with the temperature employed, more rapid reactions being obtained at elevated temperatures. Times may vary from a few minutes (e.g., 5 minutes) up to several hours or more.

The molecular proportions of hydrazine and 3,4-dicyano-1,2,5-thiadiazole, which may be brought together to carry out the reaction above, is not limited since any proportions in which the reactants are brought together will permit formation of at least some of the desired products. Thus, hydrazine:3,4-dicyano-1,2,5-thiadiazole proportions from 1:100 to 100:1 may be employed. Proportions in the range of 10:1 to 1:2 are preferred and equimolar proportions are satisfactory.

For application to plants, the compounds of Formula I may be dissolved or suspended in water and applied directly on the foliage. Dispersing agents and wetting agents may be added. The addition of an organic solvent such as acetone, an alcohol, or dimethylsulfoxide may assist in increasing the amount dissolved so that a smaller volume of liquid will need to be sprayed. The compounds may also be applied to plants as a dust, either at full strength or with the addition of inert powder extenders and/or wetting and sticking agents, as is conventional in the art.

SPECIFIC EMBODIMENTS OF THE INVENTION

The following are illustrative examples in which all parts are by weight unless stated otherwise.

EXAMPLE 1

4,7-diamino[1,2,5]thiadiazolo[3,4-d]pyridazine

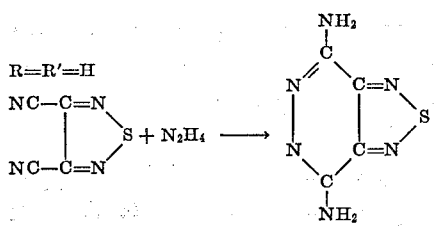

To a solution of 60 ml. of 95% hydrazine in 470 ml. of methanol was added all at once a solution of 30 g. (0.22 mole) of 3,4-dicyano-1,2,5-thiadiazole in 470 ml. of methanol. The solution was quickly brought to boiling and then set aside to cool. Filtration of the red-orange solid after standing 20 hours gave 36.7 g. (99%) of 4,7-diamino[1,2,5]thiadiazolo[3,4-d]pyridazine. This was recrystallized from hot water to give red-orange needles, decomposing at 285° C. A sample of this product prepared by a similar procedure showed the following: IR (KBr) 2.94, 3.02, 3.07, 3.20μ (NH$_2$), 6.26, 6.45μ (NH$_2$, C=C, C=N); UV (CH$_3$CN) 435 mμ (2000), 268 mμ (12,600), 220 mμ (10,700); MS M$^+$ m/e 168.

*Analysis.*—Calcd. for C$_4$H$_4$N$_6$S (percent): C, 28.56; H, 2.40; N, 49.97; S, 19.07. Found (percent): C, 28.63; H, 2.25; N, 49.81; S, 20.12.

EXAMPLE 2

4,7-diamino[1,2,5]thiadiazolo[3,4-d]pyridazine

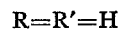

A solution of 4.22 g. (0.084 mole) of hydrazine hydrate in 60 ml. of methanol was added to a solution of 9.54 g. (0.07 mole) of 3,4-dicyano-1,2,5-thiadiazole in 100 ml. of methanol. The solution, yellow upon mixing and red upon heating, was refluxed at about 64.5° C. for 30 minutes. Filtration gave 10.5 g. (89%) of red-orange solid. Recrystallization from hot water, followed by drying first in vacuo and then azeotropically (toluene) gave 4,7-diamino[1,2,5]thiadiazolo[3,4-d]pyridazine as orange crystals, M.P. 260° C. (dec.).

EXAMPLE 3

4,7-diacetamido[1,2,5]thiadiazolo[3,4-d]pyridazine

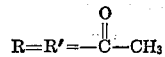

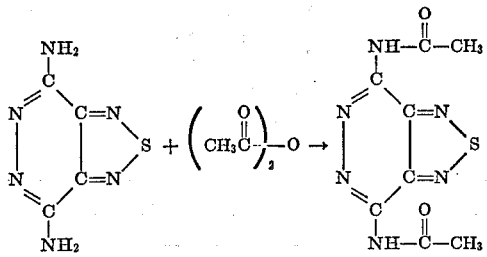

A mixture of 0.5 g. of 4,7-diamino[1,2,5]thiadiazolo-[3,4-d]pyridazine and 10 ml. of acetic anhydride was stirred at room temperature for about 16 hours. The color gradually changed from red to yellow. The mixture was drowned in diethyl ether and filtered to give 0.6 g. (80% yield) of 4,7-diacetamido[1,2,5]thiadiazolo[3,4-d]pyridazine in the form of yellow crystals.

EXAMPLE 4

4,7-diacetamido[1,2,5]thiadiazolo[3,4-d]pyridazine

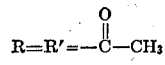

A slurry of 5.0 g. (33.8 mmoles) of 4,7-diamino[1,2,5]thiadiazolo[3,4-d]pyridazine and 60 ml. of acetic anhydride was heated at 70° C. under nitrogen for 3 hours. After concentration in vacuo, the remaining 6.2 g. of solid was washed with CH$_2$Cl$_2$ (150 ml.), tetrahydrofuran (200 ml.), and CH$_3$OH (200 ml.) to leave 5.8 g. of 4,7-diacetamido[1,2,5]thiadiazolo[3,4-d]pyridazine in the form of a yellow solid, M.P. 220° C. (dec.). The IR and nmr spectra confirmed the structure.

*Analysis.*—Calcd. for C$_8$H$_8$N$_6$O$_2$S (percent): C, 38.09; H, 3.20; N, 33.32. Found (percent): C, 36.87; H, 3.18; N, 32.58.

When 4,7-diamino[1,2,5]thiadiazolo[3,4-d]pyridazine is heated with an excess of formic acid, the excess acid serves as a reaction medium and the product obtained is 4,7-diformamido[1,2,5]thiadiazolo[3,4-d]pyridazine. The same product is also obtained when a molecular excess of formic acid is added along with the acetic anhydride in the procedures of Examples 3 and 4.

When the acid anhydrides shown in Table I are substituted for acetic anhydride in the procedures of Example 3 or 4, the indicated products are obtained.

TABLE I

| Acid anhydride | Product | R″ |
|---|---|---|
| Propionic anhydride | 4,7-dipropionamido[1,2,5]-thiadiazolo[3,4-d]pyrodazine. | C₂ |
| Butyric anhydride | 4,7-dibutyramido[1,2,5]-thiadiazolo[3,4-d]pyridazine. | C₃ |
| Hexanoic anhydride | 4,7-dihexanamido[1,2,5]-thiadiazolo[3,4-d]pyridazine. | C₅ |
| Heptanoic anhydride | 4,7-diheptanamido[1,2,5]-thiadiazolo[3,4-d]pyridazine. | C₆ |
| Cyclohexanecarboxylic anhydride. | 4,7-dicyclohexanecarboxamido[1,2,5]thiadiazolo-[3,4-d]pyridazine. | C₆ |

The following examples illustrate the use of the materials of the invention in protecting plants against ozone.

EXAMPLE 5

Pinto beans (*Phaseolus vulgaris*) were planted in vermiculite in 4″ plastic pots and grown under 12-hour days with 1100 foot-candles white fluorescent illumination. The daytime temperature and relative humidity (RH) were 75° F. and 75%, respectively, while at night they were 65° F. and 85%. Thirteen days after planting, representative plants were selected and tested as follows: One was sprayed with approximately 7 ml. of a 500 p.p.m. solution of 4,7-diamino[1,2,5]thiadiazolo[3,4-d]pyridazine in water and one was not treated. Three days later both plants were placed in a fumigator cabinet at 74° F., 75% RH and 1100 foot-candles illumination and exposed for 4 hours to 0.5 p.p.m. ozone in a flow system providing about one air change a minute. At the end of the fumigation the plants were returned to the growth room and held under the conditions cited above. Two days after the fumigation the plants were examined to determine the extent of injury. The two primary leaves of the untreated control had lesions over almost 100% of their surfaces. The lesions involved tissue collapse and chlorosis. The leaves were essentially demolished by the ozone. In contrast, the primary leaves of the treated plant showed small lesions affecting only 10% of the leaf area. These were in the form of small bronze and white flecks. After this inspection the treated plant was given a second exposure to ozone identical with the first. When examined two days later it still showed only slight damage. About 30% of the surfaces of the primary leaves were damaged at this point.

The procedure of Example 5 was repeated using sprays containing 4,7-diamino[1,2,5]thiadiazolo[3,4 - d]pyridazine at concentrations of 30 p.p.m. to 1000 p.p.m., and protection of the bean plants from ozone damage was observed. Best protection was obtained using 50 p.p.m. and above.

EXAMPLE 6

The procedure of Example 5 was repeated using 4,7-diacetamido[1,2,5]thiadiazolo[3,4-d]pyridazine in place of 4,7-diamino[1,2,5]thiadiazolo[3,4-d]pyridazine. After the first fumigation the leaf damage was about 20% and after the second fumigation the damage was about 35%. Control plants in each fumigation suffered 100% damage.

In addition to the plant shown in the examples, the compounds of the invention are useful in protecting other plants, as for example:

| | |
|---|---|
| alfalfa | marigold |
| apple | muskmelon |
| aster | oat |
| avocado | onion |
| banana | orange |
| barley | parsley |
| beans | parsnip |
| broccoli | pea |
| Brussels sprouts | peach |
| buckwheat | peanut |
| carnation | petunia |
| carrot | potato |
| celery | pumpkin |
| Chinese cabbage | radish |
| chrysanthemum | rye |
| corn | spinach |
| dahlia | squash |
| dill | strawberry |
| endive | Swiss chard |
| geranium | tobacco |
| grape | tomato |
| lemon | turnip |
| lettuce | wheat |
| lilac | |

The embodiments of the invention in which an exclusive property or privilege is claimed are defined as follows:

1. The process of protecting a plant against ozone which comprises contacting the plant with a composition consisting of an inert carrier and 30 to 1000 parts per million by weight of a compound of the formula

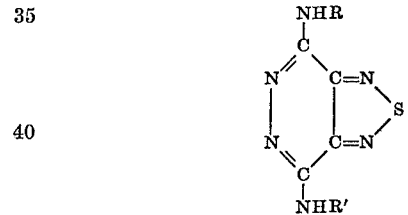

wherein R and R′, alike or different are H or

in which R″ is H or alkyl or cycloalkyl of 1 to 6 carbon atoms.

2. The process of claim 1 wherein the compound is 4,7-diamino[1,2,5]thiadiazolo[3,4-d]pyridazine.

3. The process of claim 1 wherein the compound is 4,7-diacetamido[1,2,5]-thiadiazolo[3,4-d]pyridazine.

No references cited.

JAMES O. THOMAS, Jr., *Primary Examiner*

U.S. Cl. X.R.

47—DIG 13